Patented Sept. 15, 1925.

1,553,530

UNITED STATES PATENT OFFICE.

GEORGE W. HEISE, OF BAYSIDE, NEW YORK, ASSIGNOR TO NATIONAL CARBON COMPANY, INC., A CORPORATION OF NEW YORK.

METHOD OF PREPARING DEPOLARIZING MIXTURES.

No Drawing.    Application filed August 20, 1924. Serial No. 733,238.

*To all whom it may concern:*

Be it known that I, GEORGE W. HEISE, a citizen of the United States, residing at Bayside, in the county of Queens and State of New York, have invented certain new and useful Improvements in Methods of Preparing Depolarizing Mixtures, of which the following is a specification.

The invention is a method of producing a depolarizing mixture for electric battery cells, comprising particles of manganese dioxide superficially coated with highly conductive carbon. A method of preparing such a depolarizing mixture is described and claimed in Patent No. 1,480,533 granted to William R. Clymer on January 8, 1924.

In the method as described in the said Clymer patent, the manganese dioxid and carbon are mixed together in the proportions desired in the final mixture, and jointly milled until the manganese dioxid particles are suitably coated, and a sufficient proportion of the carbon is reduced to a very fine state of subdivision. As might be supposed, a portion only of the carbon may be milled with the manganese, the remainder being added subsequently, and the advantages of the method will still be realized to a greater or less degree.

I have found that if the operation is carried out in either of these ways, the milling being continued until the carbon is comminuted and distributed to the best advantage, the manganese dioxid may be reduced to an undesirable degree of fineness, especially if some of the more friable forms of the material are used. To avoid this difficulty I have proposed in application Ser. No. 607,908, filed Dec. 19, 1922, to mill the carbon with an abrasive material, such as sand, before adding the manganese dioxid. The present invention is another method of attaining the desired comminution and distribution of the carbon without unduly comminuting the manganese dioxid.

It will be understood that comminution of the manganese dioxid beyond a certain degree is undesirable, extreme fineness giving no advantage and having the disadvantages of reducing the initial amperage of the cell and of curtailing shelf-life by increasing the solubility in the electrolyte of the manganese dioxid and substances associated therewith.

In accordance with my invention, the total quantity of carbon and manganese dioxid for a batch of depolarizing mixture is divided into two lots, the manganese-to-carbon ratio being higher in the one lot than in the final mixture, and lower in the other lot.

The ratio of manganese dioxid to carbon in the final mixture may vary considerably, depending on the type of service for which the cells made with it are to be used, and depending also on the kind of carbon and the grade of manganese used. The determination of this ratio forms no part of the present invention, which is applicable in the preparation of mix of any ratio. In present practice the ratio may vary from 2:1 or less to 3:1 or more.

In the two lots into which the materials are divided, as mentioned above, the lot which is relatively rich in manganese will contain a large proportion of all the manganese used, and will contain a small proportion of the total carbon, but enough to coat effectively the manganese associated with it. The other lot, termed herein the lean lot, will contain the bulk of the carbon and the rest of the manganese.

In my present opinion the invention owes its advantage to the fact that the two functions of joint milling are in a measure dissociated. The coating of the manganese particles is accomplished primarily in the rich lot of materials, and the production of the requisite quantity of very fine carbon, which requires a more intense milling, is effected in the lean lot of materials. Since a large proportion of the manganese is excluded from this lot, undue comminution of the part so excluded is avoided, and the average size of the manganese particles in the final mix is thereby increased.

The composition of the rich and lean lots of materials may vary considerably depending on particular conditions, a principal factor being the quality of the manganese dioxid and conductive carbonaceous material used. My experiments indicate that favorable ratios of manganese dioxid to carbon in the rich lot lie above 5:1 and that the materials may be mixed in approximately equal quantities for the lean lot. Without in any way limiting the scope of my invention, ratios of 7.5 to 1 and 1:1 may be specified as average values for the rich and lean lots of materials respectively.

The compounding of the lots for milling requires a simple calculation. If the final manganese dioxid-to-carbon ratio is to be 3:1, and if 70 pounds from each 100 pounds of carbon, and 25 pounds from each 100 pounds of manganese are combined for the lean lot, the residues constituting the rich lot, the ratios will be 1.07:1 and 7.5:1 respectively,—about the averages specified above.

The ratio of manganese dioxid to carbon in the rich lot may be much higher than the figures noted above, and indeed the rich lot may consist exclusively of manganese dioxid. The requisite quantity of fine carbon will then be produced in the lean lot and when the rest of the manganese dioxid is added to this lot and the whole subjected to a thorough mixing, the additional manganese dixoid will become sufficiently coated with the preformed fine carbon.

Having now described my invention, I claim:

1. Method of preparing a battery depolarizing mixture which comprises milling a major portion of the carbon with such a part of the manganese dioxid that the manganese-to-carbon ratio in the materials milled is less than in the final mixture, adding the rest of the manganese dioxid to the milled materials, and mixing the whole.

2. Method of preparing a battery depolarizing mixture which comprises combining the manganese dioxid and conductive carbon to be incorporated into the batteries into two lots having different ratios of manganese dioxid to carbon; separately milling said lots of materials; and mixing the lots.

3. Method of preparing a battery depolarizing mixture which comprises combining part of the manganese dioxid and conductive carbon to be incorporated into the batteries into a lot richer in manganese than the final mixture, and containing sufficient carbon effectively to coat the manganese dioxid; combining another part of the materials into a lot leaner in manganese than the final mixture, but containing sufficient manganese to promote comminution of the carbon on milling; separately milling said lots of materials; and mixing the lots.

4. Method according to claim 2 wherein the manganese-dioxid-to-carbon ratio in the lot relatively rich in manganese lies between 5:1 and 20:1.

5. Method according to claim 2 wherein the manganese-dioxid-to-carbon ratio in the lot relatively rich in manganese is about 7.5:1, and the corresponding ratio in the lean lot is about 1:1.

In testimony whereof, I affix my signature.

GEORGE W. HEISE.